United States Patent [19]

Driear et al.

[11] 4,398,315
[45] Aug. 16, 1983

[54] YIELDABLE AND RELEASABLE LIP LIFTING MECHANISM FOR A DOCKBOARD

[75] Inventors: Joseph R. Driear, Thiensville; Jonathan W. Kovach, Milwaukee, both of Wis.

[73] Assignee: Kelley Company, Inc., Milwaukee, Wis.

[21] Appl. No.: 333,251

[22] Filed: Dec. 21, 1981

[51] Int. Cl.³ .............................................. E01D 1/00
[52] U.S. Cl. ..................................................... 14/71.3
[58] Field of Search ...................... 14/71.3, 71.1, 69.5

[56] References Cited

U.S. PATENT DOCUMENTS

| | | | |
|---|---|---|---|
| 3,409,922 | 11/1968 | Beckwith | 14/71.3 |
| 3,475,778 | 11/1969 | Merrick | 14/71.3 |
| 3,528,118 | 9/1970 | Smith | 14/71.3 |
| 3,579,696 | 5/1971 | Hecker | 14/71.3 |
| 3,646,627 | 3/1972 | Potter | 14/71.3 |
| 3,967,337 | 7/1976 | Artzberger | 14/71.3 |
| 3,997,932 | 12/1976 | Artzberger | 14/71.3 |
| 4,047,258 | 9/1977 | Burnham | 14/71.3 |

Primary Examiner—Nile C. Byers, Jr.
Attorney, Agent, or Firm—Andrus, Sceales, Starke & Sawall

[57] ABSTRACT

A yieldable and releasable lip lifting mechanism for a dockboard. The dockboard includes a ramp which is pivoted at its rear edge to a supporting structure, and a lip is hinged to the forward edge of the ramp and is movable between a downwardly hanging pendant position and an extended position. As the ramp is walked down from an inclined position toward a horizontal position, a lip lifting mechanism becomes operative to raise the lip and hold the lip in the extended position. A yieldable connection is incorporated in the lip lifting mechanism which enables the lip lifting mechanism to yield and fall out of supporting engagement when a substantial force is applied to the extended lip. In addition, the yieldable connection can be manually released by an operator to permit the lip to fall to its pendant position.

10 Claims, 5 Drawing Figures

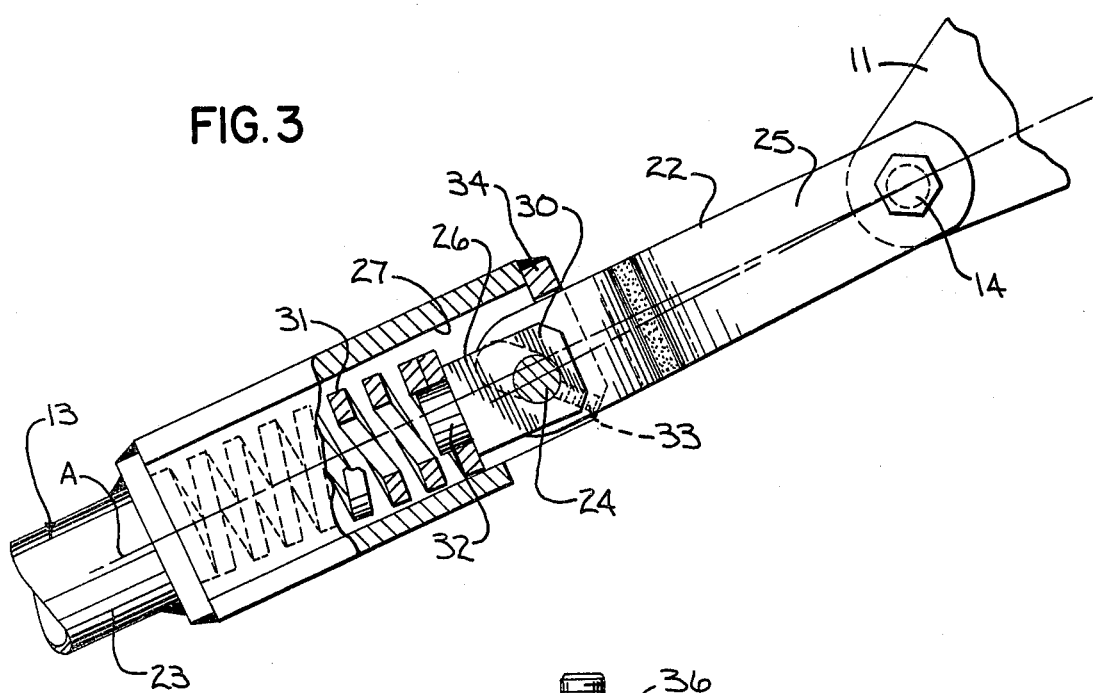
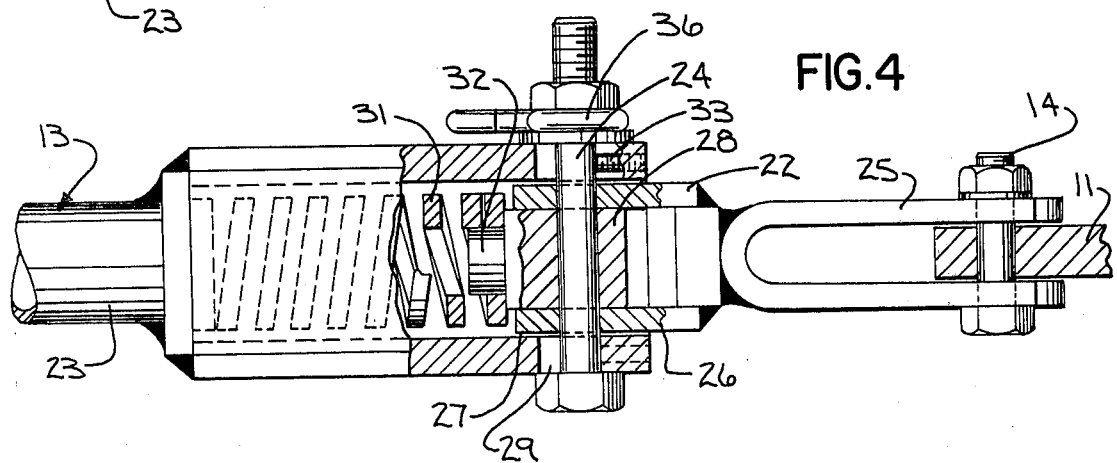
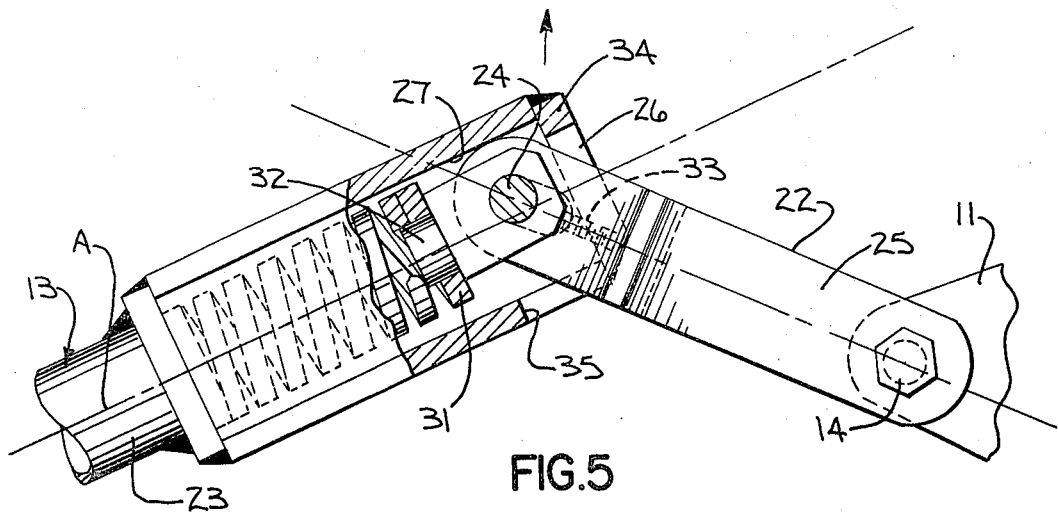

YIELDABLE AND RELEASABLE LIP LIFTING MECHANISM FOR A DOCKBOARD

BACKGROUND OF THE INVENTION

In the adjustable dockboard, as shown in U.S. Pat. No. 3,997,932, a ramp or deckplate is hinged at its rear edge to the loading dock and is adapted to be pivoted upwardly from a generally horizontal cross traffic position to an upwardly inclined position by a counterbalancing spring assembly.

A lip is hinged to the forward edge of the ramp and can be pivoted from a downwardly hanging pendant position to a partially extended position just short of its fully extended position by a lip lifting mechanism which is actuated as a consequence of the ramp being walked down from the inclined position toward the horizontal position.

The walkdown-type of lifting mechanism, as disclosed in U.S. Pat. No. 3,997,932, includes a lip lifting lug, pivoted to the ramp and having a surface adapted to engage the underside of the lip. The lug is connected through an elongated rod to one end of a link that is pivoted to the undersurface of the ramp. When the ramp is in the horizontal position, the link and rod are in an undercenter toggle position and as the ramp is elevated, a latching bar connected to the frame of the dockboard engages the link to thereby connect the link to the supporting structure. When the ramp is walked down by the operator toward the horizontal position, the relative movement of the ramp with respect to the latching bar causes the link to pivot and move the rod forwardly to thereby lift the lip toward its partially elevated position.

As described in U.S. Pat. No. 3,997,932, when the ramp has been walked down to a predetermined inclination, the link and rod move into an overcenter relationship and the latching bar is disengaged from the link. The overcenter relationship is maintained by the weight of the lip acting rearwardly through the rod.

When the ramp is walked down to a position where the lip engages the bed of a truck, the engagement of the lip with the bed of the truck will move the lip to the fully extended position, thereby releasing the weight of the lip from the rod and causing the toggle to break. With the toggle broken, the lip will automatically fall to its pendant position when the truck pulls away from the loading dock.

It has been found in the field, that a truck may inadvertently back into the extended lip, and as the lip is rigidly held in the extended position, the impact can cause damage to the elongated rod, or other components of the lip lifting mechanism.

In addition, it has been found that when the truck includes end loads which are located on the end of the truck bed, the lip may not be able to be fully extended, but instead the lip may dig into the end load as the ramp is walked down. If a substantial load, such as a fork lift truck, is moved over the ramp in an attempt to fully extend the lip, it is possible that the lip lifting mechanism can be damaged.

SUMMARY OF THE INVENTION

The invention is directed to a walkdown dockboard of the type disclosed in U.S. Pat. No. 3,997,932, which incorporates a yieldable and releasable lip lifting mechanism. In accordance with the invention, a yieldable connection is incorporated in the lip lifting mechanism which enables the lip lifting mechanism to yield and fall out of supporting engagement if substantial force or impact is applied to the extended lip. In addition, the yieldable connection can also be manually released by the operator to permit the lip to fall to its pendant position.

More particularly, the yieldable connection comprises a second toggle mechanism that is incorporated with the elongated lip supporting rod. The rod is composed of a pair of sections which are pivotally connected together by a movable pivot. In its normal lip supporting position, the rod sections are in an undercenter toggle position, and the sections are held in this slightly undercenter position by a stop.

When a force is applied to the extended lip, the stop prevents the toggle sections from moving further to an undercenter direction, and thus causing the pivot to move against the force of a spring to a position where the pivot is overcenter. With the pivot in an overcenter position, the continued force applied to the lip will then move the rod sections to a further overcenter position to break the toggle and enable the lip to move to its pendant position. With this construction, the lip supporting rod will automatically be moved to a released position when the extended lip is subjected to a substantial force or impact, thereby preventing damage to the lip lifting mechanism.

To manually release the yieldable connection, a chain or cable is attached to the pivot between the rod sections and the cable extends upwardly to a hand pull on the ramp. By pulling upwardly on the cable, the pivot can be moved to an overcenter position, and the weight of the lip acting through the forward rod section will then break the toggle between the rod sections to permit the lip to fall to its pendant position.

As a further feature, the yieldable connection will automatically reset itself at the beginning of the next operating cycle so that manual resetting of the mechanism is not required.

Other objects and advantages will appear in the course of the following description.

DESCRIPTION OF THE DRAWINGS

The drawings illustrate the best mode presently contemplated of carrying out the invention.

In the drawings:

FIG. 3 is an enlarged side elevation showing the yieldable connection in the lip lifting mechanism;

FIG. 4 is a top view of the structure shown in FIG. 3; and

FIG. 5 is a view similar to FIG. 3 showing the yieldable connection in the released position.

DESCRIPTION OF THE PREFERRED EMBODIMENT

Figure 1:
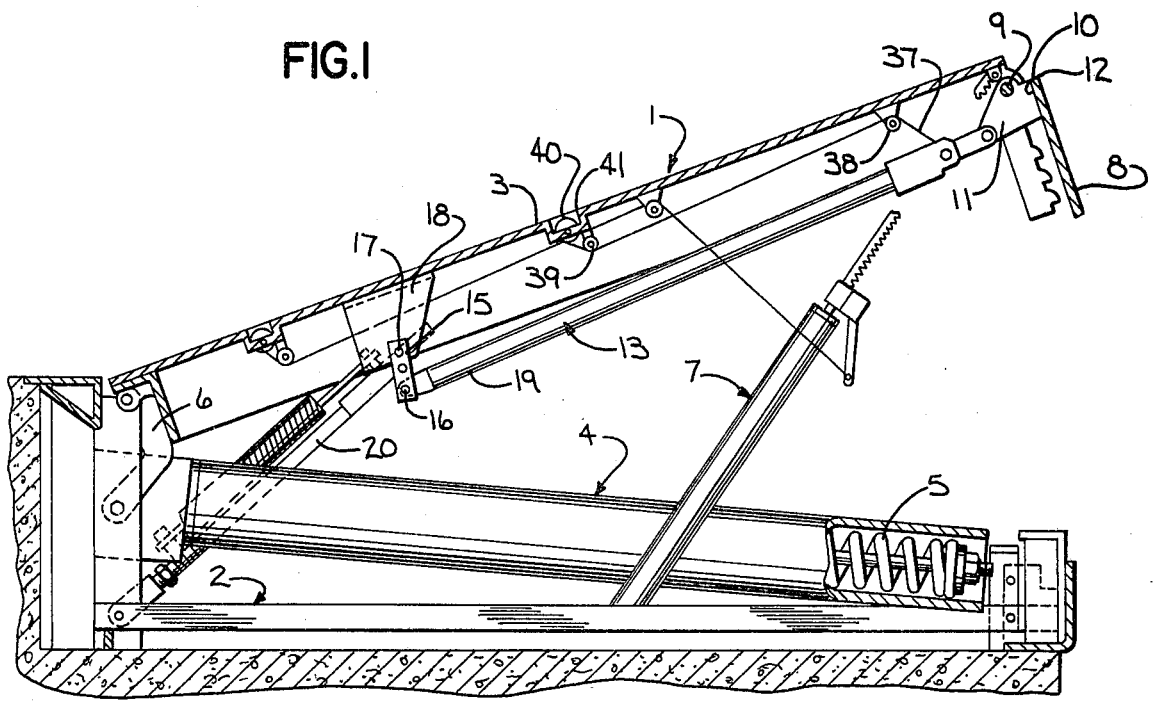
FIG. 1 is a side elevation with parts broken away of a dockboard incorporating the yieldable lip lifting mechanism of the invention and showing the ramp in the elevated position and the lip in the pendant position.
Figure 2:
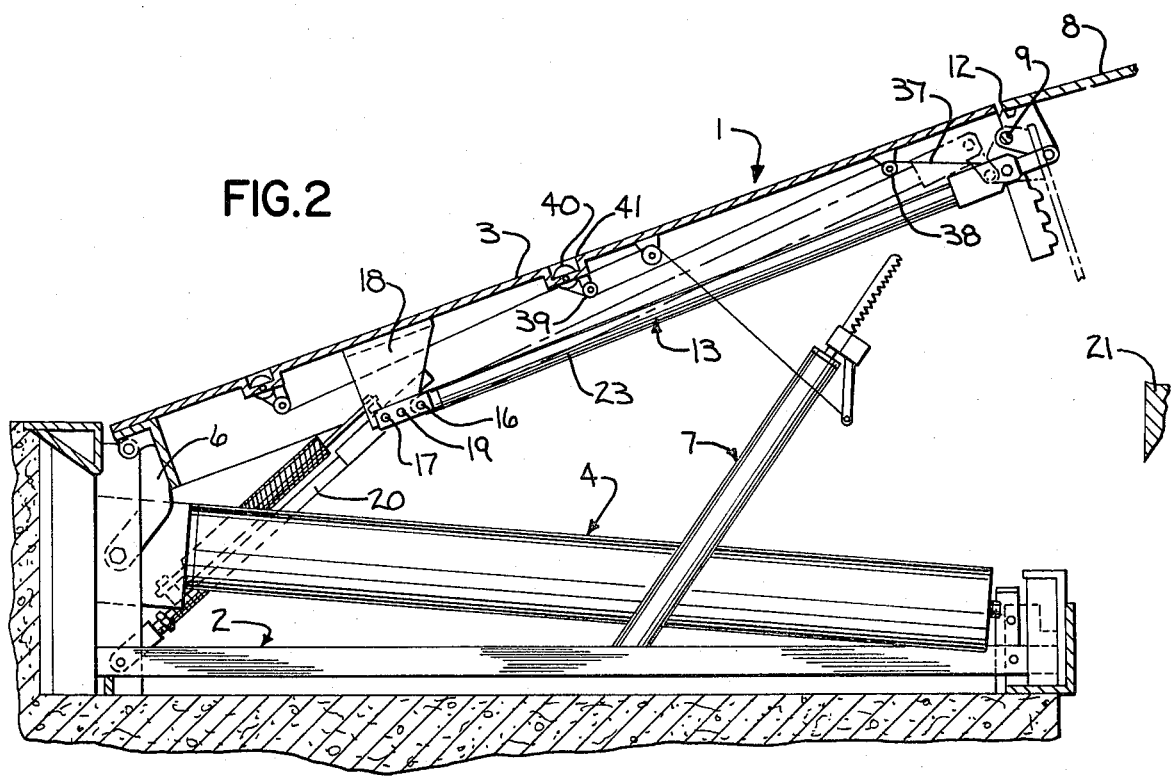
FIG. 2 is similar to FIG. 1 showing the lip in the extended position.

The drawings illustrate a dockboard 1 which is adapted to be mounted in a pit or depression in a loading dock. The dockboard 1 includes a frame 2 or supporting structure, and a ramp 3 is hinged at its rear edge to the frame. The ramp is adapted to be biased upwardly to an inclined position by a spring assembly 4, such as disclosed in U.S. Pat. No. 3,528,118. The spring assembly includes a compression spring 5 that is connected through a lever arm 6 to the rear edge of the ramp and the force of the spring acts to move the lever arm 6 forwardly to urge the ramp to an upwardly inclined position, as shown in FIG. 1.

The ramp can be held in any desired position by means of a holddown mechanism 7, as disclosed in U.S. Pat. No. 3,646,627. The holddown mechanism 7 is a uni-directional device which prevents the upward movement of the ramp unless released, while permitting free downward movement of the ramp.

An extension lip 8 is hinged to the forward edge of the ramp and is movable between a downwardly hanging pendant position and an extended position where it forms an extension to the ramp. To pivot the lip 8 to the ramp, the lip and ramp carry aligned lugs 9 which receive hinge pin 10.

The lip 8 is moved from the pendant position to the extended position by a lip lifting mechanism which operates in consequence of the ramp being walked down from the upwardly inclined position toward the horizontal cross traffic position. The lip lifting mechanism is similar to that disclosed in U.S. Pat. No. 3,997,932 and includes a lip lifting lug 11 which is pivoted to the hinge pin 10 and the forward surface 12 of lug 11 is adapted to engage the underside of the lip. As the lug is pivoted forwardly, the lip will then be swung upwardly toward its extended position.

Lug 11 is pivoted to the forward end of a yieldable rod assembly 13 by a pin 14, while the rear end of rod assembly 13 is pivotally connected to a pair of links 15 through a pin 16. The opposite ends of the links 15 are pivoted by pin 17 to brackets 18 which are fixed to the undersurface of the ramp. As described in U.S. Pat. No. 3,997,932, the links 15 and rod assembly 13 constitute a toggle mechanism.

Latch pin 19 is secured within aligned openings in links 15 and is located between the pins 16 and 17.

When the ramp is in the generally horizontal cross traffic position, the links 15 and rod assembly 13 are in an undercenter position in which the links and rod are disposed at an acute angle with respect to each other. As the ramp 3 is moved upwardly through operation of the spring assembly 4, the links 15 will be latched to the supporting frame through operation of a latch-bar 20, which is adapted to engage the latch pin 19 in the manner described in U.S. Pat. No. 3,997,932. With the links 15 latched to the frame 2, downward movement of the ramp toward the horizontal postion will cause the links to pivot forwardly, thereby moving the rod 13 forwardly and lifting the lip.

As described in U.S. Pat. No. 3,997,932, continued downward movement of the ramp will move the links 15 and rod assembly 13 beyond the in-line position to an over-center position, and the weight of the lip acting rearwardly through the rod 13 will then pivot the links 15 to a more overcenter position, causing disengagement of the latch bar 20 from the latch pin 19. The weight of the lip 8 acting through the rod 13 will, however, maintain the toggle in the overcenter position. When the ramp is walked down further, the lip will engage the truck bed 21 to pivot the lip to its fully extended position, causing the weight of the lip to be removed from the rod 13 with the result that the toggle will break. When the truck pulls away from the dock, the lip will then be free to pivot downwardly to its pendant position.

In accordance with the invention, a yieldable and releasable connection is incorporated in the lip lifting mechanism. As best illustrated in FIGS. 3 and 4, the rod assembly 13 is composed of a forward section 22 and a rear section 23 which are connected together by the pivot pin 24. As shown in FIG. 5, the forward section 22 is provided with a bifurcated end 25 which is connected to the lip lug by pin 14. The rear end 26 of forward section 22 is also bifurcated and is received within a recess 27 in the forward end of section 23. The bifurcated end 26 straddles a block 28 which is provided with a hole to receive the pivot pin 24.

As best illustrated in FIG. 4, the sides of the rear section 23 are provided with inclined slots 29 which receive the pivot pin 24, and the slots extend at an acute angle across the longitudinal center line of the section 23.

A compression spring 31 is interposed between the end of the rear section 23 and the block 28, and the forward end of the spring 31 is disposed around cylindrical spring seat 32 formed on the block. The force of the spring urges the block 28 forwardly and thus urges the pivot pin 24 into the forward or lower end of the slots 29. The normal position of the pin 24 in the slots 29 can be adjusted through use of set screws 33 which are threaded within holes in the section 23 and project upwardly into the lower ends of the slots 29. The force of the spring 31 will urge the pivot pin 24 into engagement with the set screws 33.

Rod sections 22 and 23 comprise a secondary toggle mechanism, which is normally slightly undercenter, as shown in FIG. 3, where the axis of the pivot pin 24 is located beneath the line A that connects the pivots 14 and 16. The weight of the extended lip acting through rod section 22 will tend to move the sections 22 and 23 to a more undercenter condition, but this movement is resisted by the stop bar 34. Thus, the sections 22 and 23 will hold the lip in the extended position as shown in FIG. 3. However, when a substantial force or impact is applied to the extended lip, the force cannot move the sections 22 and 23 to a further undercenter condition, and thus the force will act to compress the spring 31, thereby moving the pivot pin 24 upwardly within the inclined slots 29 to a position where the axis of the pin 24 is above the center line A, as illustrated in FIG. 5. With the pivot pin 24 in this overcenter position, the toggle sections 22 and 23 will also be overcenter, and the force applied to the lip will then cause the sections to move to a more over-center position to break the toggle and enable the lip 8 to move toward the pendant position, as shown by the phantom lines in FIG. 5. During this action, the boss 32 on block 28 remains centered in spring 31 due to the fact that boss 32 fits snugly with the ID of the spring. Spring 31 deflects laterally to permit the pin 24 to move up slots 29.

The edge 35 of the rear section 23 provides a stop to limit the position of the sections 22 and 23 in the overcenter released position to insure that the sections can be returned to their original undercenter position by gravity. Thus, with the yieldable connection, the toggle sections 22 and 23 will automatically be broken when a substantial force or impact is applied to the extended lip.

The invention also includes a provision for manually releasing the yieldable connection to enable the lip to fall to its pendant position. In this regard, an S-shaped clip 36 is mounted on the pivot pin 24 and a cable or chain 37 is connected to the clip 36 and extends over pulleys 38 and 39 mounted on the undersurface of the ramp. The end of the cable is connected to a hand pull 40 which is mounted within a well or recess 41 in the ramp.

By pulling upwardly on the hand pull 40, the cable 37 will pull the pivot pin 24 upwardly with respect to line of centers A, moving stop 34 out of contact with the section 22 and permitting center of pin 24 to move from undercenter to overcenter position with respect to line A. Pin 24 will not move out of contact with adjusting screw 33 during this operation. The weight of the lip acting through the rod section 22 will then move the toggle sections 22 and 23 to a further overcenter position, as shown in FIG. 5 to further break the toggle and enable the lip to fall to the pendant position.

The mechanism of the invention also will automatically re-set itself. For example, when the yieldable toggle connection, comprising sections 22 and 23, is broken, as shown in FIG. 5, the lip 8 will fall by gravity to the pendant position, and as the weight of the lip is removed from the main toggle mechanism, consisting of links 15 and rod assembly 13, the main toggle mechanism will also break and move to the undercenter position, as shown in FIG. 1. With the main toggle mechanism broken, the yieldable toggle will return by gravity to the position shown in FIG. 3.

Various modes of carrying out the invention are contemplated as being within the scope of the following claims particularly pointing out and distinctly claiming the subject matter which is regarded as the invention.

We claim:

1. In a dockboard having a ramp pivoted at its rear edge to a supporting structure and having a lip hinged to the front edge of the ramp and movable between a downwardly hanging pendant position and an extended position, lip lifting means for pivoting the lip from the pendant position to the extended position and for holding the lip in the extended position, said lip lifting means comprising a first toggle section having one end operably connected at a first pivot to said lip, a second toggle section having one end operably connected to the ramp at a second pivot, pivotal connecting means connecting the opposite ends of the toggle sections together, means for biasing the toggle sections into a first off-center toggle position wherein said pivotal connecting means is slightly offset in a first lateral direction from a line passing through said first and second pivots, stop means for holding said sections in said first off-center position, said toggle sections when in said first off-center position acting to support the lip in the extended position, and means responsive to a substantial force being applied to the extended lip to move said pivotal connecting means across said line to a second off-center position with respect to said line to thereby break the toggle position and enable said lip to pivot to the pendant position.

2. The dockboard of claim 1, and including second biasing means to urge the pivotal connecting means to said first off-center position, said force acting against the force of said second biasing means to move said pivotal connecting means to said second off-center position.

3. The dockboard of claim 1, wherein said pivotal connecting means comprises a pin connecting said opposite ends of said first and second toggle sections, one of said sections being provided with an elongated slot to receive said pin, said slot extending diagonally across said line when said sections are in said first off-center position, whereby said pin can move from said first off-center position to said off-center position.

4. The dockboard of claim 3, and including biasing means for urging the pin toward one end of the slot in said undercenter position.

5. The dockboard of claim 4, and including an adjustable stop located within the slot and disposed to be engaged by said pin through action of said biasing means.

6. In a dockboard, having a ramp pivoted at its rear edge to a supporting structure and having a lip hinged to the front edge of the ramp and movable between a downwardly hanging pendant position and an extended position, lip lifting means for pivoting the lip from the pendant position to the extended position and for holding the lip in the extended position, said lip lifting means comprising a first toggle section having one end operably connected at a first pivot to said lip, a second toggle section having one end operably connected to the ramp at a second pivot, pivotal connecting means connecting the opposite ends of the toggle sections together, means for biasing the toggle sections into a first under toggle position wherein said pivotal connecting means is slightly offset in an undercenter location from a line passing through said first and second pivots, and stop means for holding said sections in said first undercenter position, said toggle sections when in said first under toggle position acting to support the lip in the extended position, an external force applied to the extended lip acting to move said pivotal connecting means relative to one of said sections from said first offset undercenter location to a second offset overcenter location whereby the continued application of said force will move said toggle sections to an overtoggle position and permit said lip to fall to a pendant position.

7. The dockboard of claim 6, and including manually releasible means for moving said pivotal connecting means from said first undercenter location to said second overcenter location.

8. In a dockboard having a ramp pivoted at its rear edge to a supporting structure and having a lip hinged to the front edge of the ramp and movable between a downwardly hanging pendant position and an extended position, lip lifting means for pivoting the lip from the pendant position to the extended position and for holding the lip in the extended position, said lip lifting means comprising a first toggle section having one end operably connected at a first pivot to said lip, a second toggle section having one end operably connected to the ramp at a second pivot, a pivot pin interconnecting the opposite ends of the toggle sections together, said pin extending through a hole in said first toggle section and extending through a slot in said second toggle section, said slot extending diagonally across the axis of said second toggle section, resilient biasing means for biasing said pin to the end of the slot facing toward said lip whereby said pin is biased into an undercenter location with respect to a line passing through said first and second pivots and said toggle sections are in an under toggle position, and stop means for holding said toggle sections in said under toggle position, said toggle sections when in the under toggle position acting to support the lip in the extended position, an external force applied to the extended lip acting to move said pin within said slot against the force of said biasing means to an overcenter location whereby continued application of said extended force on said lip will pivot said toggle sections to an over toggle position and permit said lip to fall to a pendant position.

9. The dockboard of claim 8, wherein said opposite end of said second toggle section is provided with an axial recess, said biasing means comprises a compression spring disposed within said recess and acting against said pin.

10. The dockboard of claim 8, and including cable means connected to said pin and extending to a location on the upper surface of said ramp, manual pulling of said cable means acting to move said pin to an overcenter location to pivot said toggle sections to an over toggle position and permit said lip to fall to a pendant position.

* * * * *

UNITED STATES PATENT AND TRADEMARK OFFICE
CERTIFICATE OF CORRECTION

PATENT NO. : 4,398,315

DATED : August 16, 1983

INVENTOR(S) : JOSEPH R. DRIEAR ET AL

It is certified that error appears in the above-identified patent and that said Letters Patent is hereby corrected as shown below:

Col. 6, Line 1 CLAIM 4, Before "biasing" insert ---pin---; Col. 6, line 3, CLAIM 4, Cancel "undercenter" and substitute therefor ---first off-center---; Col. 6, line 6, CLAIM 5, Before "biasing" insert ---pin---; Col. 6, Line 25, CLAIM 6, Cancel "undercenter" and substitute therefor ---under-toggle---; Col. 6, Line 67, CLAIM 8, Cancel "extended" and substitute therefor ---external---.

Signed and Sealed this

Twenty-first Day of February 1984

[SEAL]

Attest:

Attesting Officer

GERALD J. MOSSINGHOFF

Commissioner of Patents and Trademarks